United States Patent [19]
Fujiki et al.

[11] Patent Number: 5,616,632
[45] Date of Patent: Apr. 1, 1997

[54] SILICONE COMPOSITIONS

[75] Inventors: Hironao Fujiki; Shigeki Shudo; Takashi Kondou, all of Usui-gun, Japan

[73] Assignee: Shin-Etsu Chemical Co., Ltd., Tokyo, Japan

[21] Appl. No.: 560,586

[22] Filed: Nov. 20, 1995

Related U.S. Application Data

[63] Continuation-in-part of Ser. No. 436,582, May 8, 1995, abandoned.

[30] Foreign Application Priority Data

May 9, 1994 [JP] Japan ..................... 6-119580

[51] Int. Cl.$^6$ ..................................... C08K 9/10
[52] U.S. Cl. ................. 523/211; 523/212; 528/15; 525/478
[58] Field of Search ............... 528/15; 525/478; 523/211, 212

[56] References Cited

U.S. PATENT DOCUMENTS 3,419,593  12/1968  Willing et al. .
5,254,656  10/1993  Bilgrien et al. .
5,373,078  12/1994  Juen et al. .

*Primary Examiner*—Melvyn I. Marquis
*Attorney, Agent, or Firm*—Millen, White, Zelano & Branigan, P.C.

[57] ABSTRACT

In a silicone composition comprising an aliphatic unsaturated group-containing diorganopolysiloxane and an organohydrogenpolysiloxane, there is blended a hydrosilylation catalyst. The catalyst is obtained by stabilizing a platinum group compound with an organopolysiloxane of formula (3):

$$R^4_f R^5_g (CH_3)_h SiO_{(4-f-g-h)/2} \qquad (3)$$

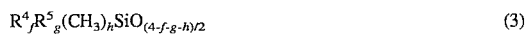

wherein $R^4$ is a $C_{2-8}$ aliphatic unsaturated group, $R^5$ is a monovalent hydrocarbon group excluding an aliphatic unsaturated group and methyl group, letters f, g, and h are $(f+g)/(f+g+h) \geq 0.10$, $0.0001 < f \leq 2.0$, and $1.8 < f+g+h < 2.205$. The stabilized platinum group compound is included in a silicone resin comprising at least a $R^6 SiO_{3/2}$ or $SiO_{4/2}$ unit wherein $R^6$ is a monovalent hydrocarbon group, at least 10 mol % of the organic groups being the same group as $R^5$, the silicone resin having a melting or softening point of 30° to 200° C. The composition has improved shelf stability and curing properties.

14 Claims, No Drawings

SILICONE COMPOSITIONS

CROSS REFERENCE TO RELATED APPLICATION

This application is a continuation-in-part of application Ser. No. 08/436,582 filed on May 8, 1995, now abandoned, the entire contents of which are hereby incorporated by reference.

BACKGROUND OF THE INVENTION

1. Field of the Invention

This invention relates to a silicone composition of the addition curing type and more particularly, to such a silicone composition which is shelf stable at room temperature, quickly curable upon heating, and applicable in a variety of fields as potting agents, adhesives, and coating agents and in extrusion molding and liquid injection molding systems.

2. Prior Art

On heating, silicone compositions of the addition curing type are curable through hydrosilylation reaction in the presence of platinum compound catalysts. They are used in a multiplicity of applications because of the advantages that the curing reaction completes within a very short time and entails no by-products. Undesirably, these silicone compositions are unstable during shelf storage at room temperature. One countermeasure is to divide the composition into two parts for storage and combine them together on use, but it is unacceptable for practical use.

To overcome this drawback, a number of compounds capable of controlling a hydrosilylation reaction have been proposed. For example, U.S. Pat. No. 3,188,300 discloses organic phosphorus compounds, U.S. Pat. No. 3,445,420 or JP-B 31476/1969 discloses acetylene alcohols, U.S. Pat. No. 3,882,083 or JP-B 41626/1980 discloses triallylisocyanurates, U.S. Pat. No. 4,061,609 or JP-B 20340/1982 discloses hydroperoxides, U.S. Pat. No. 3,699,073 or JP-B 10947/1973 and U.S. Pat. No. 3,923,705 or JP-B 56563/1988 disclose high vinyl siloxanes. Silicone compositions having such control agents added thereto offer a sufficient pot life and curability as long as the compositions are used by conventional techniques. In the current market, more severe requirements are imposed on silicone compositions, that is, more satisfactory shelf stability and quick curing characteristics are required.

Encapsulation techniques are known to satisfy such requirements. In JP-B 41707/1978, a protected catalyst powder is prepared by mixing a platinum catalyst with a silicone resin having a melting point of 40° to 200° C. and pulverizing or spray drying the mixture. U.S. Pat. No. 4,481,341 or JP-A 37053/1983, U.S. Pat. No. 4,784,879 or JP-A 47442/1989 and 45468/1989 disclose a platinum catalyst encapsulated with a thermoplastic resin. The former technique cannot fully improve the shelf stability of silicone compositions. The latter technique of microcapsulation with organic resin is successful in enhancing the shelf stability of silicone compositions, but not in providing quick curing characteristics as required in the current market.

Therefore, there is a need to have a technique capable of further improving the shelf stability and curing characteristics of addition curing type silicone compositions.

SUMMARY OF THE INVENTION

An object of the present invention is to provide a silicone composition of the addition curing type which has satisfactory shelf stability and improved curing characteristics and is quickly curable upon heating.

According to the present invention, there is provided a silicone composition comprising, in admixture, (A) a diorganopolysiloxane, (B) an organohydrogenpolysiloxane, and (C) a hydrosilylation catalyst.

The diorganopolysiloxane (A) is of the general formula (1):

$$R^1{}_a R^2{}_b (CH_3)_c SiO_{(4-a-b-c)/2} \qquad (1)$$

wherein $R^1$ is an aliphatic unsaturated group having 2 to 8 carbon atoms, $R^2$ is a substituted or unsubstituted monovalent hydrocarbon group excluding an aliphatic unsaturated group and methyl group, letters a, b, and c are numbers in the range: $c/(a+b+c) \geq 0.95$, $0.0001 < a < 0.05$, and $1.8 < a+b+c < 2.205$. The diorganopolysiloxane contains at least two aliphatic unsaturated groups in a molecule. At least 95 mol % of the organic groups bonded to silicon atoms (exclusive of a silicon-oxygen bond) is methyl.

The organohydrogenpolysiloxane (B) is of the general formula (2):

$$R^3{}_d H_e SiO_{(4-d-e)/2} \qquad (2)$$

wherein $R^3$ is a substituted or unsubstituted monovalent hydrocarbon group, letters d and e are numbers in the range: $0.002 \leq e \leq 1.0$, $0.8 \leq d < 2.2$, and $0.8 < d+e \leq 3.0$. The organohydrogenpolysiloxane has at least three hydrogen atoms each bonded to a silicon atom in a molecule.

The hydrosilylation catalyst (C) is in the form of a platinum group compound stabilized by coordination with an organopolysiloxane of the general formula (3):

$$R^4{}_f R^5{}_g (CH_3)_h SiO_{(4-f-g-h)/2} \qquad (3)$$

wherein $R^4$ is an aliphatic unsaturated group having 2 to 8 carbon atoms, $R^5$ is a substituted or unsubstituted monovalent hydrocarbon group excluding an aliphatic unsaturated group and methyl group, letters f, g, and h are numbers in the range: $(f+g)/(f+g+h) \geq 0.10$, $0.0001 < f \leq 2.0$, and $1.8 < f+g+h < 2.205$. The organopolysiloxane contains at least two aliphatic unsaturated groups in a molecule. At least 10 molt of the organic groups bonded to silicon atoms (exclusive of a silicon-oxygen bond) is a group other than methyl. The stabilized platinum group compound is included or enclosed in a silicone resin comprising at least one kind of unit selected from the group consisting of $R^6SiO_{3/2}$ and $SiO_{4/2}$ units, and optionally further comprising $R^6{}_3SiO_{1/2}$ and/or $R^6{}_2SiO_{2/2}$ units wherein $R^6$ is a substituted or unsubstituted monovalent hydrocarbon group. At least 10 mol % of the organic groups bonded to silicon atoms (exclusive of a silicon-oxygen bond) is the same group as $R^5$ in formula (3). The silicone resin has a melting or softening point of 30° C. to 200° C.

By blending diorganopolysiloxane (A), organohydrogenpolysiloxane (B), and hydrosilylation catalyst (C), there is obtained a silicone composition of the addition curing type which remains unchanged in quality after long-term storage at room temperature (for example, 10° C. to 30° C.), need not be divided into two or more parts for shelf storage. That is, the composition has satisfactory shelf stability. Upon heating, the composition is quickly curable into cured products having satisfactory physical properties. These physical properties change little depending on environmental conditions during storage covering from room temperature to elevated temperature.

More particularly, in the silicone composition of the invention, the aliphatic unsaturated group-bearing organopolysiloxane of formula (3) is coordinated to the platinum group compound for stabilizing and fixing the platinum group compound to form a siloxane complex of the platinum group compound. This stabilized platinum group compound is included or incorporated in the silicone resin defined above which is essentially incompatible with the diorganopolysiloxane of formula (1) at room temperature (for example, 10° C. to 30° C.), but compatible with the organopolysiloxane of formula (3) owing to their similarity in structure. The resin embedment allows the platinum group compound as a hydrosilylation catalyst to be kept outside the reaction system under storage conditions. Heating causes the platinum group compound to diffuse uniformly in the system for promoting hydrosilylation reaction. Since the present invention is characterized in that the platinum group compound is made compatible and integral with the enclosing silicone resin during storage, it is apparently distinguishable from the catalyst powder having platinum catalyst protected with silicone resin described in JP-B 41707/1978 and the containment of platinum element in micro-capsules described in U.S. Pat. No. 4,481,341 and JP-A 5063/1993. This difference, quite surprisingly, contributes to significantly superior long-term shelf stability and quick curing properties as compared with the conventional encapsulation techniques.

Moreover, the silicone composition of the invention eliminates the drawback of the conventional microcapsulation techniques that once heated above the melting point, the composition becomes short in shelf life. Even when the composition has physically experienced high shear forces during manufacture, its capability is not impaired at all. The drawback that shelf stability is instantaneously or gradually lost is also eliminated.

BEST MODE FOR CARRYING OUT THE INVENTION

A first essential component (A) of the silicone composition of the present invention is an organopolysiloxane which is selected from well-known organopolysiloxanes commonly used as the main component of conventional addition curing type silicone rubber compositions. More particularly, it is a diorganopolysiloxane of the general formula (1).

  (1)

wherein $R^1$ is an aliphatic unsaturated group having 2 to 8 carbon atoms, $R^2$ is a substituted or unsubstituted monovalent hydrocarbon group excluding an aliphatic unsaturated group and methyl group, letters a, b, and c are numbers in the range: $c/(a+b+c) \geq 0.95$, $0.0001 < a < 0.05$, and $1.8 < a+b+c < 2.205$. The diorganopolysiloxane contains at least two aliphatic unsaturated groups in a molecule. At least 95 mol % of the organic groups bonded to silicon atoms (exclusive of a silicon-oxygen bond) is methyl.

More particularly, $R^1$ is an aliphatic unsaturated group having 2 to 8 carbon atoms, for example, alkenyl group such as vinyl, allyl, propenyl, and butenyl groups, with alkenyl groups such as vinyl being most preferred. $R^2$ is a substituted or unsubstituted monovalent hydrocarbon group excluding an aliphatic unsaturated group and methyl group, preferably having 2 to 12 carbon atoms, for example, alkyl groups exclusive of methyl such as ethyl, propyl and butyl, aryl groups such as phenyl and tolyl, and substituted ones of these groups wherein all or some of the hydrogen atoms are substituted by halogen atoms or the like, such as 3,3,3-trifluoropropyl, $C_4F_9CH_2CH_2—$, $C_8F_{17}CH_2CH_2—$, and perfluoroalkyl ether groups. Letters a, b, and c are numbers satisfying $c/(a+b+c) \geq 0.95$, $0.0001 < a < 0.05$, and $1.8 < a+b+c < 2.205$.

The diorganopolysiloxane of formula (1) should contain at least two aliphatic unsaturated groups preferably having 2 to 8 carbon atoms, typically at least two alkenyl groups as $R^1$ in a molecule. At least 95 mol % of the organic groups bonded to silicon atoms (exclusive of a silicon-oxygen bond), that is, based on 100 mol % of $R^1$, $R^2$ and $CH_3$ in formula (1) combined, should be methyl.

The diorganopolysiloxane of formula (1) may be either a linear one or a branched one partially containing an $RSiO_{3/2}$ or $SiO_{4/2}$ unit wherein R is a substituted or unsubstituted monovalent hydrocarbon group. Preferably it has a viscosity of about 50 to 10,000,000 centipoise (cp) at 25° C. A diorganopolysiloxane with a viscosity of less than 50 cp would be too brittle to provide silicone rubber elasticity. A diorganopolysiloxane with a viscosity of more than 10,000,000 cp would be unsuitable for blending as rubber.

The diorganopolysiloxane of formula (1) can be synthesized by any well-known method, for example, by effecting equilibration reaction between an organocyclopolysiloxane and a hexaorganodisiloxane in the presence of an alkali or acid catalyst.

A second essential component (B) of the silicone composition according to the invention is an organohydrogenpolysiloxane which serves as a crosslinking agent by reacting with diorganopolysiloxane (A). It is of the general formula (2):

  (2)

wherein $R^3$ is a substituted or unsubstituted monovalent hydrocarbon group, letters d and e are numbers in the range: $0.002 \leq e \leq 1.0$, $0.8 \leq d < 2.2$, and $0.8 < d+e \leq 3.0$. It has at least three hydrogen atoms each bonded to a silicon atom in a molecule.

In formula (2), $R^3$ is preferably a substituted or unsubstituted monovalent hydrocarbon group having 1 to 12 carbon atoms, for example, aliphatic unsaturated groups such as vinyl, allyl, propenyl and butenyl, alkyl groups such as methyl, ethyl, propyl and butyl, aryl groups such as phenyl and tolyl, and substituted ones of these groups wherein all or some of the hydrogen atoms are substituted by halogen atoms or the like, such as 3,3,3-trifluoropropyl, $C_4F_9CH_2CH_2—$, $C_8F_{17}CH_2CH_2—$, and perfluoroalkyl ether groups. Letters d and e are numbers satisfying $0.002 \leq e \leq 1.0$, $0.8 \leq d < 2.2$, and $0.8 < d+e \leq 3.0$. Preferably $0.01 \leq e < 1.0$, $1.5 < d \leq 2.0$, and $1.6 d+e < 2.8$.

The organohydrogenpolysiloxane of formula (2) should have at least three hydrogen atoms each bonded to a silicon atom in a molecule.

No particular limit is imposed on the molecular structure of the organohydrogenpolysiloxane of formula (2). It may be either of linear, cyclic and branched structures. Preferably it has a viscosity of about 1 to 500 cp at 25° C.

The organohydrogenpolysiloxane of formula (2) can be readily synthesized by any well-known method, for example, by effecting equilibration reaction of octamethylcyclotetrasiloxane, tetramethylcyclotetrasiloxane, and a compound containing hexamethyldisiloxane or 1,1'-dihydro-2,2',3,3'-tetramethyldisiloxane to become a terminal group in the presence of a catalyst such as sulfuric acid, trifluoromethanesulfonic acid, and methanesulfonic acid at a temperature of about −10° C. to about +40° C.

In the practice of the invention, organohydrogenpolysiloxane (B) is preferably blended so that the amount of the hydrogen atom bonded to a silicon atom in formula (2) is 0.4 to 10 equivalents, especially 0.8 to 5 equivalents per aliphatic unsaturated group contained in the entire composition. Less than 0.4 equivalent of hydrogen atom on this basis would lead to a too low crosslinking density, sometimes adversely affecting the heat resistance of silicone rubber. With more than 10 equivalents of hydrogen atom, a bubbling problem would result from dehydrogenation reaction and heat resistance would be exacerbated.

A third essential component (C) of the silicone composition according to the present invention is a hydrosilylation catalyst in the form of a platinum group compound which is stabilized by coordination with an organopolysiloxane and further included in a silicone resin. The organopolysiloxane used herein is of the general formula (3):

$$R^4{}_f R^5{}_g (CH_3)_h SiO_{(4-f-g-h)/2} \quad (3)$$

wherein $R^4$ is an aliphatic unsaturated group having 2 to 8 carbon atoms, $R^5$ is a substituted or unsubstituted monovalent hydrocarbon group excluding an aliphatic unsaturated group and methyl group, letters f, g, and h are numbers in the range: $(f+g)/(f+g+h) \geq 0.10$, $0.0001 < f \leq 2.0$, and $1.8 < f+g+h+ 2.205$. The organopolysiloxane of formula (3) contains at least two aliphatic unsaturated groups in a molecule. At least 10 mol %, preferably 10 to 95 mol %, more preferably 30 to 95 mol % of the organic groups bonded to silicon atoms (exclusive of a silicon-oxygen bond), that is, based on 100 mol % of $R^4$, $R^5$, and $CH_3$ in formula (3) combined, is a group other than methyl. The silicone resin in which the stabilized platinum group compound is included is a silicone resin comprising at least one kind of unit selected from the group consisting of $R^6 SiO_{3/2}$ and $SiO_{4/2}$ units, and optionally further comprising $R^6{}_3 SiO_{1/2}$ and/or $R^6{}_2 SiO_{2/2}$ units wherein $R^6$ is a substituted or unsubstituted monovalent hydrocarbon group. At least 10 mol % of the organic groups bonded to silicon atoms (exclusive of a silicon—oxygen bond) is the same group as $R^5$ in formula (3). The silicone resin has a melting or softening point of 30° to 200° C.

This hydrosilylation catalyst promotes hydrosilylation reaction between diorganopolysiloxane (A) and organohydrogenpolysiloxane (B) to produce a crosslinked structure in the silicone composition so that the composition may be used as an elastomer after curing.

Any of compounds of platinum, rhodium, ruthenium and palladium may be used as the platinum group compound. Platinum compounds are preferred from the standpoints of economy and ability. Exemplary platinum compounds are commonly used ones such as chloroplatinic acid, complexes thereof with alcohols, and complexes thereof with vinylsiloxanes such as divinyltetramethyldisiloxane, and 1,3,5,7-tetravinyl-1,3,5,7-tetramethylcyclotetrasiloxane In the organopolysiloxane of formula (3) with which the platinum compound is stabilized by coordination, $R^4$ is an aliphatic unsaturated group having 2 to 8 carbon atoms, for example, alkenyl groups such as vinyl, allyl, propenyl, and butenyl and alkynyl groups such as ethynyl and propargyl, with the alkenyl groups, typically vinyl being preferred. $R^5$ is a substituted or unsubstituted monovalent hydrocarbon group excluding an aliphatic unsaturated group and methyl group, preferably having 2 to 12 carbon atoms, for example, alkyl groups exclusive of methyl such as ethyl, propyl, and butyl, aryl groups such as phenyl and tolyl, and substituted ones of these groups wherein all or some of the hydrogen atoms are substituted by halogen atoms or the like, such as 3,3,3-trifluoropropyl, $C_4F_9CH_2CH_2$—, $C_8F_{17}CH_2CH_2$—, and perfluoroalkyl ether groups, with the phenyl and fluorinated hydrocarbon groups being preferred. Letters f, g, and h are numbers satisfying $(f+g)/(f+g+h) \geq 0.10$, $0.0001 < f \leq 2.0$, and $1.8 < f+g+h < 2,205$.

The organopolysiloxane of formula (3) should contain at least two aliphatic unsaturated groups in a molecule. At least 10 mol % of the organic groups bonded to silicon atoms (exclusive of a silicon-oxygen bond) is a group other than methyl. Preferably the organopolysiloxane of formula (3) is substantially insoluble or sparingly soluble in diorganopolysiloxane (A) at room temperature (for example, 0° to 30° C.). Preferably the organopolysiloxane of formula (3) has a viscosity of about 1 to 5,000,000 cp at 25° C., especially 100 to 1,000,000 cp at 25° C. and a degree of siloxane polymerization of up to about 1,000.

Examples of the organopolysiloxane of formula (3) include high vinyl content organopolysiloxanes described in U.S. Pat. No. 3,699,073 corresponding to JP-B 10947/1973 as well as compounds of the following structures.

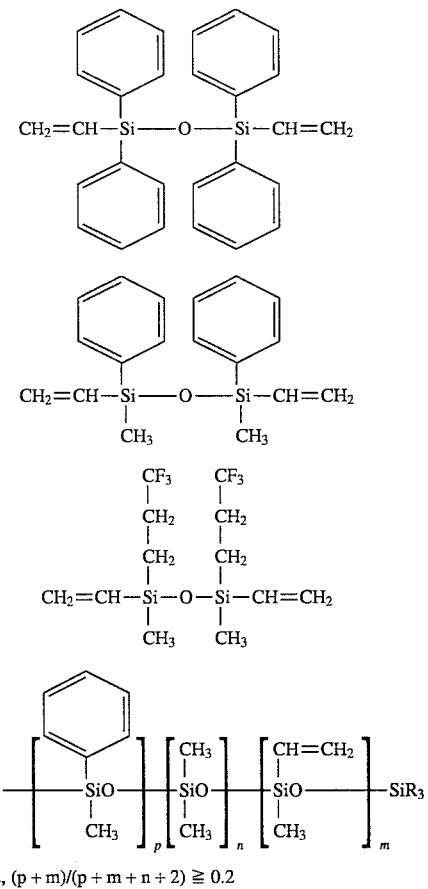

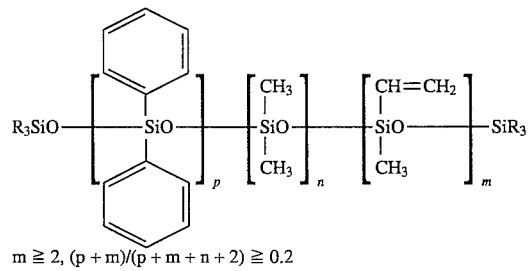

$m \geq 2$, $(p + m)/(p + m + n + 2) \geq 0.2$

-continued

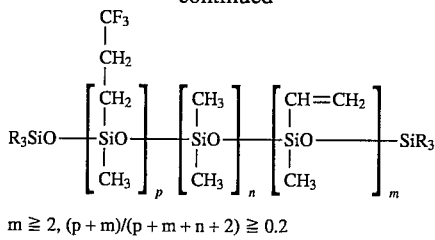

$m \geq 2$, $(p+m)/(p+m+n+2) \geq 0.2$

R: methyl, vinyl, phenyl or trifluoropropyl

Stabilization by coordination of the platinum group compound may be accomplished by forming a siloxane complex of the platinum group compound, for example, by directly reacting chloroplatinic acid with an organopolysiloxane of formula (3) followed by neutralization with sodium hydrogen carbonate, or by ripening an alcohol or vinylsiloxane complex of chloroplatinic acid together with an organopolysiloxane of formula (3).

The organopolysiloxane of formula (3) may be used in amounts such that the alkenyl group in the organopolysiloxane is present in an amount of at least 2 moles, preferably 2 to 80 moles, more preferably 5 to 20 moles per one mole of the platinum group metal. If the molar ratio is less than 2, the stabilization of the platinum group compound by coordination may not be fully attained. If the molar ratio is more than 80, the catalytic activity of the platinum group may be lowered.

The silicone resin in which the stabilized platinum group compound is included is a silicone resin comprising at least a $R^6SiO_{3/2}$ or $SiO_{4/2}$ unit among $R^6{}_3SiO_{1/2}$, $R^6{}_2SiO_{2/2}$, $R^6SiO_{3/2}$, and $SiO_{4/2}$ units. At least 10 mol % of the organic groups bonded to silicon atoms exclusive of a silicon-oxygen bond is the same group as $R^5$ in formula (3). The silicone resin has a melting or softening point of 30° to 200° C. This silicone resin is generally compatible with the stabilized platinum group compound, but incompatible with diorganopolysiloxane (A) under normal temperature (e.g., 10° C. to 30° C.). Preferably, the silicone resin contains 0 to 30 mol % of $R^6{}_3SiO_{1/2}$ unit, 0 to 30 mol % of $R^6{}_2SiO_{2/2}$ unit and 70 to 100 mol % of $R^6SiO_{3/2}$ unit in the absence of $SiO_{4/2}$ unit, or contains 0 to 50 mol % of $R^6SiO_{3/2}$ unit, 0 to 30 mol % of $R^6{}_2SiO_{2/2}$ unit, 0 to 70 mol % of $R^6SiO_{3/2}$ unit and 30 to 80 mol % of $SiO_{4/2}$ unit.

$R^6$ is a substituted or unsubstituted monovalent hydrocarbon group, for example, those groups exemplified for $R^3$ in formula (2).

In the silicone resin, at least 10 mol % of the entire organic groups bonded to silicon atoms is the same group as $R^5$ in formula (3), with phenyl and fluorinated groups being most desirable.

The silicone resin has a melting or softening point of 30° to 200° C., especially 40° C. to 150° C. A silicone resin with a melting or softening point of lower than 30° C. permits the catalyst component to bleed out, detracting from shelf stability. A silicone resin with a melting or softening point of higher than 200° C. will not effectively and quickly melt or soften upon heat curing of the composition, prohibiting effective utilization of the catalyst component.

Preferred examples of the silicone resin are phenyl-containing silicone resins and fluorinated silicone resins as described in JP-A 5063/1993 and U.S. Pat. No. 5,232,959 or JP-A 36354/1992. It is to be noted that these prior art techniques also use platinum-vinylsiloxane complexes similar to those used in the present invention. The present invention is different from the prior art techniques in that the siloxane forming the platinum-siloxane complex has a structure analogous to the silicone resin enclosing the platinum-siloxane complex so that these two are compatible and integratable. Owing to this feature, the silicone composition is surprisingly improved in shelf stability.

The stabilized platinum compound is included in the silicone resin, for example, by mixing the two components in an organic solvent such as dichloromethane, benzene, methyltrichlorosilane, and dioxane and spray drying or freeze drying the solution. In this regard, the mixing ratio between the stabilized platinum compound and the enclosing silicone resin is preferably such that the resulting hydrosilylation catalyst may have a softening point of 30° to 200° C. Generally the enclosing silicone resin occupies about 80 to 99.9% by weight of the entire hydrosilylation catalyst.

In the composition of the invention, the hydrosilylation catalyst is preferably added in such an amount as to provide about 1 to about 2,000 parts, more preferably about 5 to about 1,000 parts by weight of platinum group metal atom per million parts by weight of the entire composition. Less than 1 ppm would fail to provide the composition with a satisfactory curing rate. More than 2,000 ppm would be economically disadvantageous and can detract from shelf stability.

In the silicone composition of the invention, an adhesive component may be additionally blended in order to impart adhesive ability. The adhesive component used herein includes those compounds commercially available as carbon functional silanes, such as vinyltrimethoxysilane, vinyltris(2-methoxyethoxy)silane, 3-methacryloxypropyltrimethoxysilane, 3-glycidoxypropyltrimethoxysilane, and 2-(3,4-epoxycyclohexyl)ethyltrimethoxysilane; and compounds having a hydrogen atom, alkenyl, alkoxy or epoxy group directly bonded to a silicon atom in a molecule, as exemplified below.

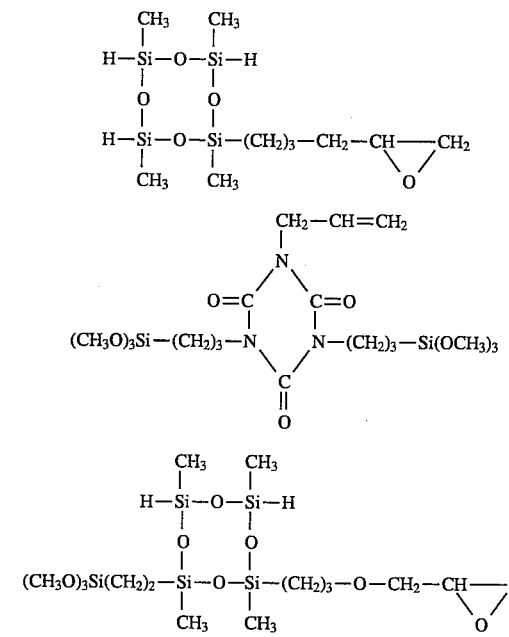

Preferably the adhesive component is added in amounts of 0 to 20 parts per 100 parts by weight of diorganopolysiloxane (A).

Where it is desired to impart strength to the composition of the invention, finely divided silica having a specific gravity of 50 m²/g or more is added. Examples of the finely divided silica include Aerosil 130, 200 and 300 (Nihon Aerosil K. K. and Degussa Inc.), Cabosil MS-5 and MS-7 (Cabot Corp.), Rheorosil QS-102 and QS-103 (Tokuyama Soda K. K.), and Nipsil LP (Nihon Silica K. K.) as hydrophilic silica; and Aerosil R-812, R-812S, R-972 and R-974 (Degussa Inc.), Rheorosil MT-10 (Tokuyama Soda K. K.), and Nipsil SS series (Nihon Silica K. K.) as hydrophobic silica. Preferably 0 to 30 parts by weight of the finely divided silica is added per 100 parts by weight of diorganopolysiloxane (A).

In the practice of the invention, the silicone composition may further contain therein other components, for example, semi-reinforcing fillers such as ground quartz, diatomaceous earth, calcium carbonate, alumina and carbon black; inorganic pigments such as cobalt blue; coloring agents such as organic dyes; agents for enhancing heat resistance and flame resistance such as cerium oxide, zinc carbonate, manganese carbonate, iron oxide and titanium oxide. These components may be added in conventional amounts insofar as the effect of the present invention is not impaired.

EXAMPLE

Examples of the present invention are given below by way of illustration and not by way of limitation. All parts are by weight.

Synthetic Example 1

Preparation of Platinum Compound

A flask with a stirrer was charged with 4 g of chloroplatinic acid, 15 g of an organopolysiloxane compound of the structure shown below (7.1 moles of vinyl group in the organopolysiloxane per one mole of platinum metal), and 100 g of methyl isobutyl ketone and then with 2.6 g of sodium hydrogen carbonate. The contents were stirred for one hour at room temperature, heated to 80° C., and stirred for a further 4 hours at the temperature.

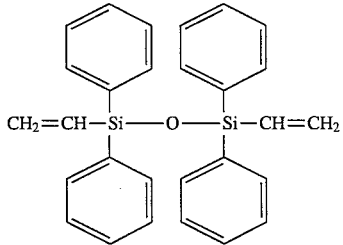

Next, the solution was concentrated at 80° C. in a vacuum of 10 mmHg, obtaining a vinylphenylsiloxane complex of chloroplatinic acid (designated platinum compound A, platinum concentration 1%).

Preparation of Phenylsiloxane Resin

A flask with a stirrer was charged with 148 g of phenyltrichlorosilane and 53 g of propyltrichlorosilane, which were subject to hydrolysis. Then 5 g of hexamethyldisilane was added to the flask. The contents were stirred for 2 hours at 70° C., effecting silylation. The volatiles were distilled off in vacuum, yielding phenylsiloxane resin having a softening point of 83° C. and 0.1 mol % of Si-OH group (designated silicone resin A).

Preparation of Hydrosilylation Catalyst

In 100 g of dichloromethane were dissolved 30 g of platinum compound A and 30 g of silicone resin A. The solution was spray dried, obtaining 17 g of a hydrosilylation reaction catalyst having the platinum compound enclosed in the silicone resin (designated catalyst 1).

Synthetic Example 2

In 100 g of benzene were dissolved 30 g of platinum compound A and 30 g of silicone resin A (both prepared in Synthetic Example 1). The solution was solidified with dry ice/methanol, allowed to warm up to room temperature in vacuum, and kept in vacuum until the solvent distilled off. This freeze drying technique yielded 28 g of a hydrosilylation reaction catalyst having the platinum compound enclosed in the silicone resin (designated catalyst 2).

Synthetic Example 3

Synthesis of 3,3,3-trifluoropropyl-Containing Vinylsiloxane Oil

In a flask equipped with a dropping funnel, reflux condenser, and stirrer, 15 g of a cyclic siloxane trimer of 3,3,3-trifluoropropyltrimethylcyclotrisiloxane was dissolved in 200 g of tetrahydrofuran. To the solution 1,000 g of magnesium vinyl bromide was added dropwise. Distilled water was added to the reaction solution, which was heated at 60° C. and stirred for 3 hours.

The reaction solution was concentrated at 100° C. under a vacuum of 10 mmHg. The concentrate was poured into a mixture of 10% aqueous hydrochloric acid and toluene in a molar ratio of 1:1, heated at 60° C. and stirred for 20 hours. Thereafter, the solution was washed with water and dried over sodium sulfate, obtaining a 3,3,3-trifluoropropyl group-containing vinylsiloxane oil of the following structure.

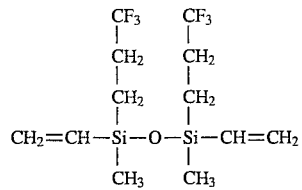

Preparation of Platinum Compound

A flask with a stirrer was charged with 4 g of chloroplatinic acid, 12 g of the 3,3,3-trifluoropropyl-containing vinylsiloxane oil (7.0 moles of vinyl group in the vinylsiloxane oil per 1 mole of platinum metal), and 100 g of methanol and then with 2.6 g of sodium hydrogen carbonate. The contents were stirred for one hour at room temperature, heated to 80° C., and stirred for a further 4 hours at the temperature.

Next, the solution was concentrated at 60° C. in a vacuum of 10 mmHg, obtaining a 3,3,3-trifluoropropyl-containing vinylsiloxane complex of chloroplatinic acid (designated platinum compound B, platinum concentration 1%).

Preparation of Fluorinated Siloxane Resin

A flask with a stirrer was charged with 185 g of trifluoropropyltrichlorosilane and 30 g of methyltrichlorosilane, which were subject to hydrolysis. Then 5 g of hexamethyldisilane was added to the flask. The contents were stirred for 2 hours at 70° C., effecting silylation. The volatiles were distilled off in vacuum, yielding a fluorinated siloxane resin having a softening point of 86° C. and 0.2 mol % of Si-OH group (designated silicone resin B).

Preparation of Hydrosilylation Catalyst

In 150 g of dioxane were uniformly dissolved 30 g of platinum compound B and 30 g of silicone resin B. The solution was freeze dried, obtaining 16 g of a hydrosilylation reaction catalyst having the platinum compound enclosed in the silicone resin (designated catalyst 3).

Synthetic Example 4

Synthesis of Vinyl-Containing 3,3,3-trifluoropropylsiloxane Long Chain Oil

In a flask equipped with a dropping funnel, reflux condenser, and stirrer, 22 g of a cyclic siloxane trimer of methylvinylcyclotrisiloxane was dissolved in 63 g of acetonitrile. A catalytic amount of a penta-coordinated silicon catalyst of the formula shown below and distilled water were added to the solution, which was stirred for 4 hours.

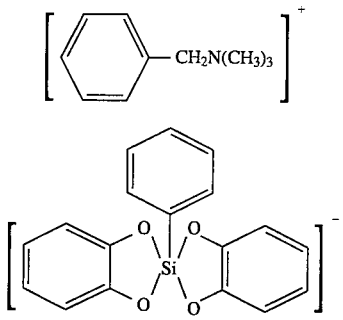

The solution was then cooled to 10° C., in which 200 g of a cyclic siloxane trimer of 3,3,3-trifluoropropyltrimethylcyclotrisiloxane and a catalytic amount of the pentacoordinated silicon catalyst were dissolved and stirred for 6 hours.

Further, 20.4 g of dimethylvinylchlorosilane and 35 g of pentamethyldivinyldisilazane were added to the solution, which was heated at 100° C. and stirred for one hour. Thereafter, the solution was concentrated at 150° C. in a vacuum of 20 mmHg. The concentrate was allowed to cool down to room temperature and filtered under pressure, obtaining a vinyl-containing 3,3,3-trifluoropropylsiloxane long chain oil of the following structure.

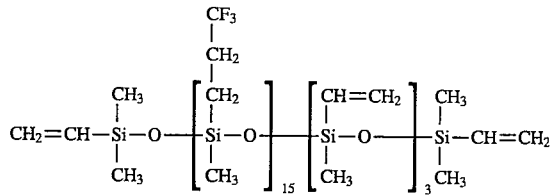

Preparation of Platinum Compound

A flask with a stirrer was charged with 10 g of a toluene solution of 1,3-divinyl-1,1,3,3-tetramethyldisiloxane platinum complex (platinum concentration 5%), 90 g of the vinyl-containing 3,3,3-trifluoropropylsiloxane long chain oil (63 moles of vinyl group in the long chain oil per mole of platinum metal), and 200 g of methyl isobutyl ketone. The contents were heated to 80° C. and stirred for 4 hours.

Next, the solution was concentrated at 80° C. in a vacuum of 10 mmHg, obtaining a vinyl-containing 3,3,3-trifluoropropyl long chain siloxane platinum complex (designated platinum compound C, platinum concentration 1%).

Preparation of Hydrosilylation Catalyst In 150 g of dioxane were uniformly dissolved 30 g of platinum compound C and 30 g of silicone resin B. The solution was freeze dried, obtaining 17 g of a hydrosilylation reaction catalyst having the platinum compound enclosed in the silicone resin (designated catalyst 4).

Synthetic Example 5

Preparation of Platinum Compound

A flask with a stirrer was charged with 4 g of chloroplatinic acid, 6.4 g of 1,3-divinyl-1,1,3,3-tetramethyldisiloxane (7.0 moles of vinyl group in the disiloxane per 1 mole of platinum metal), and 100 g of ethanol and then with 2.6 g of sodium hydrogen carbonate. The contents were stirred for one hour at room temperature, heated to 80° C., and stirred for a further 4 hours at the temperature.

Next, the solution was concentrated at 80° C. in a vacuum of 10 mmHg, obtaining a vinylmethylsiloxane complex of chloroplatinic acid (designated platinum compound D, platinum concentration 0.5%).

Preparation of Hydrosilylation Catalyst

In 150 g of dichloromethane were dissolved 30 g of platinum compound D and 30 g of silicone resin A (prepared in Synthetic Example 1). The solution was spray dried, obtaining 16 g of a hydrosilylation reaction catalyst having the platinum compound enclosed in the silicone resin (designated catalyst 5).

Synthetic Example 6

Preparation of hydrosilylation catalyst

In 150 g of dioxane were dissolved 30 g of platinum compound D (prepared in Synthetic Example 5) and 30 g of silicone resin B (prepared in Synthetic Example 3). The solution was freeze dried, obtaining 16 g of a hydrosilylation reaction catalyst having the platinum compound enclosed in the silicone resin (designated catalyst 6).

Example 1

A kneader was charged with 100 parts of a dimethylsiloxane polymer blocked with a dimethylvinylsilyl group at either end and having a viscosity of 10,000 centipoise (cp) at 25° C., 20 parts of fumed silica having a specific surface area of 300 m²/g, 8 parts of hexamethyldisilazane, and 1 part of water. The contents were agitated and kneaded for one hour at room temperature, heated to 150° C., and kneaded for a further 2 hours at the temperature. The mixture was then cooled down to room temperature. To the mixture were added 20 parts of a dimethylsiloxane polymer blocked with a dimethylvinylsilyl group at either end and having a viscosity of 10,000 cp at 25° C. and 3 parts of hydrogenmethylpolysiloxane of the following formula having a viscosity of about 10 cp at 25° C. They were uniformly mixed.

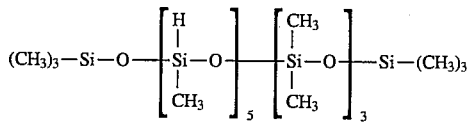

To 100 parts of the mixture were added 1 part of 1,5-dihydrogen-1,3,5,7-tetramethyl-3-trimethoxysilylethyl-7-glycidylpropyltetrasiloxane and 0.2 part of triallylisocyanurate. They were uniformly mixed, obtaining a silicone rubber base compound.

To 100 parts of the silicone rubber base compound was added 0.5 part of catalyst 1 obtained in Synthetic Example 1. They were uniformly mixed, obtaining a curable silicone composition.

Example 2

A curable silicone composition was prepared as in Example 1 except that 0.5 part of catalyst 2 obtained in Synthetic Example 2 was added instead of catalyst 1.

Example 3

To 100 parts of the silicone rubber base compound prepared in Example 1 was added 0.5 part of catalyst 3 obtained in Synthetic Example 3. They were uniformly mixed and further uniformly milled in a three-roll mill, obtaining a curable silicone composition.

Example 4

To 100 parts of the silicone rubber base compound prepared in Example 1 was added 0.5 part of catalyst 4 obtained in Synthetic Example 4. They were uniformly mixed, obtaining a curable silicone composition.

Comparative Example 1

To 100 parts of the silicone rubber base compound prepared in Example 1 was added 1 part of catalyst 5 obtained in Synthetic Example 5. They were uniformly mixed, obtaining a curable silicone composition. Comparative Example 2

To 100 parts of the silicone rubber base compound prepared in Example 1 was added 1 part of catalyst 6 obtained in Synthetic Example 6. They were uniformly mixed, obtaining a curable silicone composition.

These curable silicone compositions of Examples 1–4 and Comparative Examples 1–2 were examined for curing properties and shelf stability. The results are shown in Table 1.

Curing Upon Heating.

A silicone composition was heated at 120° C. for curing. Using a curelastmeter, the time (IT) taken until curing of the composition initiated and the time (T90) taken until the torque reached 90% of the maximum were determined as measures of curability.

Shelf Stability

A silicone composition was allowed to stand at 40° C. and the time taken until the composition lost fluidity was determined as a pot life.

TABLE 1

|  | Example | | | | Comparative Example | |
|---|---|---|---|---|---|---|
|  | 1 | 2 | 3 | 4 | 1 | 2 |
| Curing properties | | | | | | |
| IT (sec.) | 30 | 31 | 31 | 32 | 30 | 22 |
| T90 (sec.) | 90 | 95 | 100 | 1000 | 90 | 84 |
| Shelf stability Pot life (day) | 7 | 7 | 10 | 12 | 3 | 3 |

As is evident from Table 1, the compositions within the scope of the invention (Examples 1 to 4) have good curing behavior and improved shelf stability.

There has been described a silicone composition which has improved shelf stability in that it is stable at room temperature over a long time and acceptable curing properties in that it is quickly curable upon heating, and which accommodates the recent requirements in the market. The composition is applicable in a variety of fields as potting agents, adhesives, and coating agents and in extrusion molding and liquid injection molding systems.

Japanese Patent Application No. 119580/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A silicone composition comprising, in admixture, (A) a diorganopolysiloxane of the general formula (1):

$$R^1_a R^2_b (CH_3)_c SiO_{(4-a-b-c)/2} \qquad (1)$$

wherein $R^1$ is an aliphatic unsaturated group having 2 to 8 carbon atoms, $R^2$ is a substituted-or unsubstituted monovalent hydrocarbon group excluding an aliphatic unsaturated group and methyl group, letters a, b, and c are numbers in the range: $c/(a+b+c) \geq 0.95$, $0.0001 < a < 0.05$, and $1.8 < a+b+c < 2.205$, said diorganopolysiloxane containing at least two aliphatic unsaturated groups in a molecule, at least 95 mol % of the organic groups bonded to silicon atoms exclusive of a silicon-oxygen bond being methyl, (B) an organohydrogenpolysiloxane of the general formula (2):

$$R^3_d H_e SiO_{(4-d-e)/2} \qquad (2)$$

wherein $R^3$ is an substituted or unsubstituted monovalent hydrocarbon group, letters d and e are numbers in the range: $0.002 \leq e \leq 1.0$, $0.8 \leq s\ d < 2.2$, and $0.8 < d+e \leq 3.0$, having at least three hydrogen atoms each bonded to a silicon atom in a molecule, and (C) a hydrosilylation catalyst in the form of a platinum group compound stabilized by coordination with an organopolysiloxane of the general formula (3):

$$R^4_f R^5_g (CH_3)_h SiO_{(4-f-g-h)/2} \qquad (3)$$

wherein $R^4$ is an aliphatic unsaturated group having 2 to 8 carbon atoms, $R^5$ is a substituted or unsubstituted monovalent hydrocarbon group excluding an aliphatic unsaturated group and methyl group, letters f, g, and h are numbers in the range: $(f+g)/(f+g+h) \geq 0.10$, $0.0001 < f \leq 2.0$, and $1.8 < f+g+h < 2.205$, said organopolysiloxane containing at least two aliphatic unsaturated groups in a molecule, at least 10 mol % of the organic groups bonded to silicon atoms exclusive of a silicon-oxygen bond being a group other than methyl, said stabilized platinum group compound being included in a silicone resin comprising at least one kind of units selected from the group consisting of $R^6 SiO_{3/2}$ and $SiO_{4/2}$ units, and optionally further comprising $R^6_3 SiO_{1/2}$ and/or $R^6_2 SiO_{2/2}$ units wherein $R^6$ is a substituted or unsubstituted monovalent hydrocarbon group, at least 10 mol % of the organic groups bonded to silicon atoms exclusive of a silicon-oxygen bond being the same group as $R^5$ in formula (3), said silicone resin having a melting or softening point of 30° to 200° C.

2. The silicone composition of claim 1 wherein the organohydrogenpolysiloxane is present in an amount such that the amount of the hydrogen atom bonded to a silicon atom in formula (2) is 0.4 to 10 equivalents per aliphatic unsaturated group contained in the entire composition.

3. The silicone composition of claim 1 wherein the silicone resin contains 0 to 30 mol % of $R^6_3SiO_{1/2}$ unit, 0 to 30 mol % of $R^6_2SiO_{2/2}$ unit and 70 to 100 mol % of $R^6SiO_{3/2}$ unit wherein $R^6$ is as described above.

4. The silicone composition of claim 1 wherein the silicone resin contains 0 to 50 mol % of $R^6_3SiO_{1/2}$ unit, 0 to 30 mol % of $R^6_2SiO_{2/2}$ unit, 0 to 70 mol % of $R^6SiO_{3/2}$ unit and 30 to 80 mol % of $SiO_{4/2}$ unit wherein $R^6$ is as described above.

5. The silicone composition of claim 1 wherein the compound occupies about 80 to 99.9% by weight of the entire hydrosilylation catalyst.

6. The silicone composition of claim 1 wherein the hydrosilylation catalyst is present in such an amount as to provide about 1 to about 2,000 parts by weight of platinum group metal atom per million parts by weight of the entire composition.

7. The silicone composition of claim 1, wherein, in formula (1), the $R^1$ groups are independently a vinyl, allyl, propenyl or butenyl group, and the $R^2$ groups are independently an ethyl, propyl, butyl, phenyl or tolyl group wherein some or all of the hydrogen atoms are optionally replaced by halogen atoms.

8. The silicone composition of claim 1, wherein the diorganopolysiloxane of formula (1) has a viscosity of 50 to 10,000,000 cp at 25° C.

9. The silicone composition of claim 1, wherein, in formula (2), the $R^3$ groups are independently a substituted or unsubstituted monovalent hydrocarbon group of 1–12 carbon atoms.

10. The silicone composition of claim 1, wherein, in formula (2), the $R^3$ groups are independently a vinyl, allyl, propenyl, butenyl, methyl, ethyl, propyl, butyl, phenyl or tolyl group wherein some or all of the hydrogen atoms are optionally replaced by halogen atoms.

11. The silicone composition of claim 1, wherein the organohydrogenpolysiloxane of formula (2) has a viscosity of 1 to 500 cp at 25° C.

12. The silicone composition of claim 1, wherein the platinum group compound is a platinum-containing compound.

13. The silicone composition of claim 1, wherein, in formula (3), the $R^4$ groups are independently a vinyl, allyl, propenyl, butenyl, ethynyl or propargyl group and the $R^5$ groups are independently an ethyl, propyl, butyl, phenyl or tolyl group wherein some or all of the hydrogen atoms are optionally replaced by halogen atoms.

14. The silicone composition of claim 1, wherein the organopolysiloxane of formula (3) has a viscosity of 1 to 5,000,000 cp at 25° C.

* * * * *